United States Patent [19]

Baatz

[11] 4,011,757
[45] Mar. 15, 1977

[54] DEVICE FOR BYPASSING FLOW RATE PULSATIONS AROUND A FLOW RATE TRANSDUCER

[75] Inventor: Wilfried Baatz, Bellevue, Wash.

[73] Assignee: FloScan Instrument Company, Inc., Seattle, Wash.

[22] Filed: May 14, 1975

[21] Appl. No.: 577,188

[52] U.S. Cl. .............................. 73/229; 73/114; 73/199

[51] Int. Cl.² ................. G01F 1/06; G01F 15/02

[58] Field of Search ............... 73/229, 231 R, 199, 73/194, 114, 198, 209, 210, 406, 408; 138/26, 30; 137/505.4, 505.15; 417/542

[56] References Cited

UNITED STATES PATENTS

| 1,399,117 | 12/1921 | Hastings | 73/408 |
|---|---|---|---|
| 2,077,572 | 4/1937 | Lofgren | 73/408 X |
| 2,285,777 | 6/1942 | Mack | 73/408 |
| 2,883,995 | 4/1959 | Bialous et al. | 73/406 X |
| 3,583,220 | 6/1971 | Kawakami | 73/229 X |
| 3,792,610 | 2/1974 | Kountanis et al. | 73/229 |
| 3,872,723 | 3/1975 | Busch | 73/194 R |

FOREIGN PATENTS OR APPLICATIONS

| 228,226 | 11/1910 | Germany | 73/198 |

Primary Examiner—Richard C. Queisser
Assistant Examiner—John P. Beauchamp
Attorney, Agent, or Firm—Christensen, O'Connor, Garrison & Havelka

[57] ABSTRACT

A device for bypassing flow rate pulsations resulting in reverse flow and abrupt flow rate surges around a volumetric flow rate transducer includes a housing defining a chamber. One end of the chamber is coupled in fluid communication with the inlet or upstream side of the transducer while the other end of the chamber is coupled in fluid communication with the outlet or downstream side of the transducer. A flexible, fluid impervious diaphragm is mounted in the housing so as to divide the chamber into two compartments. The diaphragm is affixed to the walls of the chamber so as to maintain a fluid seal between the two compartments of the chamber. When a forward flow rate pulsation occurs the resultant rise in the fluid pressure differential between the upstream and downstream compartments of the chamber will shift the diaphragm toward the downstream compartment. As the diaphragm moves, fluid is forced out of the downstream compartment and into the fluid stream on the downstream side of the transducer. After the pulse reaches its maximum and the flow begins to reverse, the reverse flowing fluid will drive the diaphragm back toward the compartment coupled to the upstream side of the transducer. As this occurs, the volume of the fluid that was driven into this chamber during the flow rate increase is exhausted from the upstream side of the chamber and is driven into the fluid stream upstream of the transducer. The net effect of the operation of the pulsation bypass device is to allow flow rate pulsations resulting in reverse flow to pass through the diaphragm, isolating the flow transducer from the pulsations by allowing the diaphragm to flex against the biasing spring and time averaging the flow through the transducer. Thus, the transducer is not exposed to sudden increases or decreases in flow rate.

18 Claims, 15 Drawing Figures

DEVICE FOR BYPASSING FLOW RATE PULSATIONS AROUND A FLOW RATE TRANSDUCER

BACKGROUND OF THE INVENTION

The present invention relates to volumetric flow measurement, more particularly to measurement of volumetric flow with a transducer interposed in a fluid conduit, which transducer has a rotating rotor from which a signal proportional to flow rate through the transducer is derived, and more particularly to a device for bypassing reverse flow rate pulsations past such a transducer and for time averaging sudden increases and decreases in flow rate through the transducer to overcome inherent response limitations in this particular type of transducer.

A growing concern over long term availability and cost of fuel for automobiles has increased a demand for low-cost fuel flow rate transducers to provide input signals for miles per gallon and total fuel consumption indicating instruments. A flow rate transducer that has a low pressure drop, that provides a wide linear flow rate response range, that provides a digital output signal, and that can be readily incorporated into present automotive fuel supply streams is required for such an application. Fluid flow rate transducers of the turbine type particularly meet these requirements. One such turbine type flow rate transducer is disclosed in U.S. Pat. No. 3,867,840, issued to Wilfried Baatz and assigned to FloScan Instrument Company, expressly incorporated herein by reference. Such turbine type flow rate transducers have a rotor that is rotated at an angular velocity proportional to the steady state fluid flow rate through the transducer. An optical or other electronic sensor is employed to detect the angular velocity of the rotor and to provide an electronic output signal that is proportional to the angular velocity of the rotor.

Such flow rate transducers are capable of providing very accurate output signals over relatively large flow rate ranges when subjected to steady state flow and gradual changes in flow rate. However, automotive fuel supply systems inherently experience abrupt changes in flow rate and moreover never operate under steady state conditions. The flow rate pulsations in an automotive engine fuel supply system are inherently characteristic of the flow generated by a diaphragm pump normally employed to pump fuel from a fuel tank to the carburetor of the engine. The typical diaphragm pump generates flow rate pulsations in the fuel line between the fuel pump and the carburetor that will result in reverse flow of fluid through the line at low average flow conditions. Abrupt flow rate changes also occur under the flow conditions encountered in automotive fuel supply systems. For example, when fuel vapor bubbles present in the fuel supply line vent into the float chamber of a carburetor, a sudden increase in flow rate occurs in the supply line followed by a sudden decrease in flow rate when the vapor bubble is completely vented into the float chamber. Moreover, when the float chamber and float controlled inlet valve in a typical carburetor are moved, the fuel in the float chamber tends to slosh, causing the float controlled inlet valve to open and close quickly, in turn causing abrupt flow rate changes in the fuel line.

The flow rate reversals and the abrupt increases and decreases in flow rate caused by fuel sloshing in the carburetor float chamber and by vapor bubbles in the fuel supply line detrimentally affect the response accuracy of turbine type flow transducers interposed in the fuel supply line. When the transducer is subjected to a continuous series of flow reversals, the fuel flowing backwardly through the transducer will be measured twice in the forward direction causing the turbine type transducer to provide a flow rate signal that is continuously and substantially higher than the average actual flow rate. consequently, the transducer does not provide an accurate signal for indicating actual flow rate or for calculating total flow through the transducer. When the transducer rotor is subjected to a sudden increase in flow rate followed by a sudden decrease in flow rate, the rotor will tend to speed up more quickly in response to the increase in flow rate than it will tend to slow down after a corresponding decrease in flow rate. Thus, integration of the flow rate signal with respect to time will provide an indication of total flow that is greater than the actual flow through the transducer.

Although one skilled in the electronic signal conditioning art can define an electronic circuit that will compensate for the signal error derived from the turbine type transducer under these flow conditions, such an electronic circuit would be relatively sophisticated and expensive to produce. For some application, the electronic approach to solving the problem might be applicable. However, for use in conjunction with an automobile fuel system, an electronic signal conditioning circuit for eliminating the error from the indicated signal would be relatively expensive, and would prohibit its use, even on a large mass production scale.

It is therefore an object of the present invention to provide a flow rate transducer system that can provide an accurate indication of flow rate and total fluid flow without the necessity of electronically conditioning the signal to eliminate error. It is a further object of the present invention to provide a relatively inexpensive, mechanical device that can be employed in a fluid flow measurement system to adjust the flow through a turbine type transducer so that the signal from the transducer is indicative of the actual average flow rate through the fluid system. It is a further object of the present invention to provide a device that bypasses fluid flow rate pulsations that result in flow reversals past the flow transducer while averaging all fluid flow through the transducer. It is a further object of the present invention to provide such a device that isolates the flow transducer from sudden increases or decreases in flow rate. It is another object of the present invention to provide such a device that averages the flow through the transducer over a period of time so as to eliminate flow rate pulsations through the transducer. It is still another object of the present invention to provide such a device that is relatively simple in concept, economical to manufacture, easy to install in present fluid flow systems and is easy and inexpensive to maintain. It is also an object of the present invention to provide an improvement in such a device that aids in eliminating flow discontinuities through the flow rate transducer caused by vapor bubbles present in a liquid as it passes through the flow rate transducer. It is still another object of the present invention to provide a device that accomplishes the foregoing objects while providing a means for cooling the fuel passing through the transducer to decrease the volume of vapor production in the fuel line.

SUMMARY OF THE INVENTION

The foregoing objects and other objects that will become apparent to those of ordinary skill upon reading the following specification, are provided in a flow rate pulsation bypass and flow rate averaging device that can be coupled to the fluid flow conduit adjacent a turbine-type flow transducer that allows flow rate pulsations to bypass the transducer and that prevents the transducer from experiencing sudden changes in flow rate. In a broad aspect, the invention comprises means defining a fluid chamber having a wall, a first end and a second end, a movable member mounted in the chamber for movement between a first position located toward the first end of the chamber and a second position located toward the second end of the chamber, means for forming a seal between the movable member and the wall of the chamber thereby forming a movable fluid barrier between the first and second ends of the chamber, and means positioned in the chamber to coact with the movable member to bias the movable member toward the first position. The first end of the chamber is placed in fluid communication with the inlet to the transducer while the second end of the chamber is placed in fluid communication with the outlet from the transducer. The movable member and biasing means are so constructed that flow rate changes and concomitant pressure pulses will create a force on the movable member, causing the movable member toward the chamber in which the lower pressure exists. As a flow rate pulse occurs on the inlet side of the transducer, the pulse will be transmitted through the chamber by movement of the movable member against the biasing means. As the flow reverses after the pulse, the movable member will shift toward the first end of the chamber, driving fluid from the first end of the chamber into the fluid system upstream from the chamber. In this manner, the device of the present invention coacts with the fluid being measured by the transducer to time average flow rate pulsations through the transducer, thus allowing the transducer to experience substantially constant flow. Moreover, the device of the present invention will isolate the transducer from sudden increases and decreases in flow rate by increasing the fluid volume on the upstream side of the transducer through movement of the movable member and maintaining that volume until an accompanying decrease in flow rate occurs, at which time a biasing means returns the movable member to its first position, decreasing the volume in the first end of the chamber, and at the same time moving additional fluid through the transducer so that it will experience a gradual decrease in flow rate.

BRIEF DESCRIPTION OF THE DRAWINGS

A better understanding of the present invention can be derived by reading the ensuing specification in conjunction with accompanying drawings wherein.

DESCRIPTION OF PREFERRED EMBODIMENT

Figures 1, 2, 3, 4:
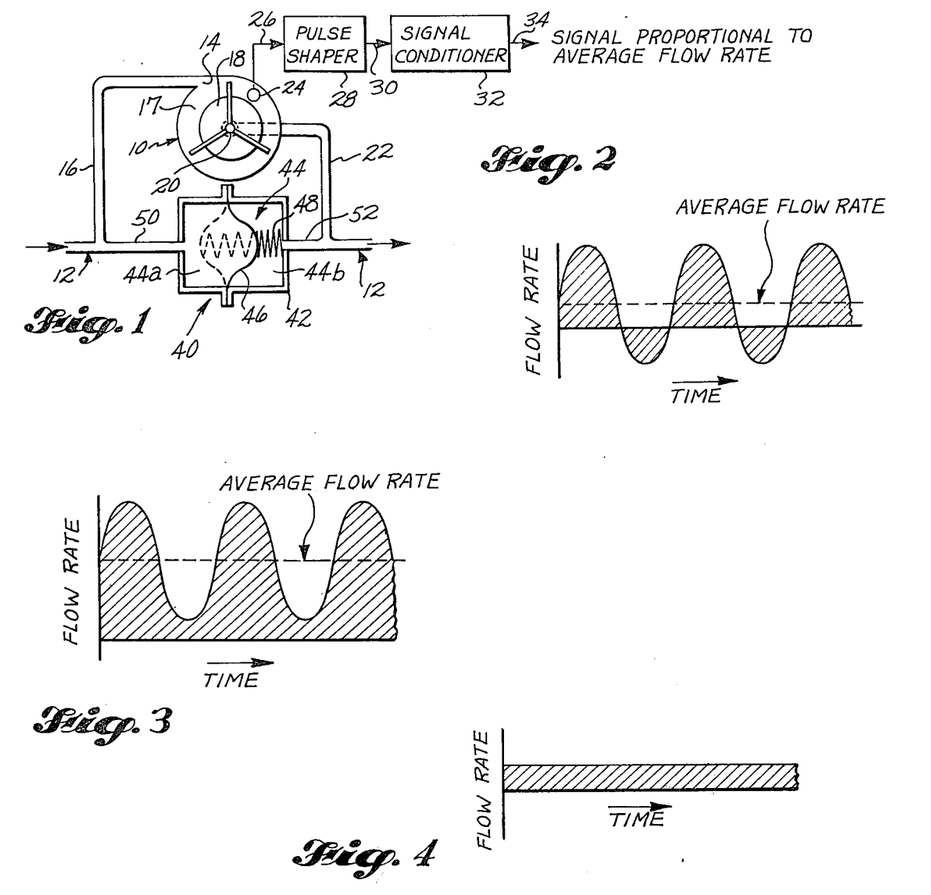
FIG. 1 is a schematic representation of the pulsation bypass device of the present invention coupled to a turbine type flow rate transducer interposed in a fluid conduit through which flow rate is to be measured and a block diagram of associated electronics.
FIG. 2 is a graph of flow rate versus time depicting flow rate pulsations that create a flow reversal in a fluid system such as that including a diaphragm type liquid pump supplying fuel to an automobile carburetor.
FIG. 3 is a graph of flow rate versus time showing a higher average flow rate than that depicted in the graph of FIG. 2.
FIG. 4 is a graph of actual flow rate through the transducer when the pulsation bypass device of the present invention is employed, assuming the flow in the fluid line is similar to that depicted in the graph of FIGS. 2 and 3.

In accordance with the present invention, a flow rate transducer, generally designated 10 in FIG. 1, is coupled to a fluid conduit 12 through which fluid is being pumped. The tangential inlet 14 to the transducer 10 is connected via an inlet conduit 16 to an upstream portion of the fluid conduit 12. Fluid pumped through conduit 12 enters the inlet conduit 16 and is tangentially injected through inlet 14 into the flow chamber 17 of the transducer 10. The fluid rotates a rotor 18 mounted in bearings in the chamber 17, spirals inwardly and upwardly and is exhausted through an axial outlet 20 in one end of the transducer 10. The outlet 20 is coupled via an outlet conduit 22 to a downstream portion of the fluid conduit 12. As is conventional and as is disclosed in the aforementioned U.S. Pat. No. 3,867,840, a detector 24 is associated with the transducer to detect the angular velocity or rotational speed of the rotor 18. Any suitable photo-sensitive element, such as a light emitting diode and photo-sensitive diode, can be employed. As the detector 24 senses the passage of the blades of the rotor 18, an intermittent signal from the photo-sensitive element is transmitted via an electrical line 26 to a pulse shaping circuit 28 of conventional design. The pulse is then transmitted through electrical line 30 to an appropriate signal conditioner 32, which provides an output signal via line 34. The output signal is indicative of the flow rate through the transducer 10, since the rotational speed or angular velocity of the rotor 18 is proportional to the flow rate through the transducer, at least when a constant flow rate or gradually increasing or decreasing flow rate is established through the transducer.

As mentioned above, when fluid is being pumped by a diaphragm pump through the main conduit 12, flow rate pulsations occur in the conduit 12. These flow pulsations are graphically represented as a sinusoid in FIGS. 2 and 3. Referring first to FIG. 2, the flow rate at zero time first rises rapidly and then falls back to an average value. Thereafter, it drops below the average value and at low flow rates reverses in direction as indicated by the portion of the sinusoid below the abscissa on the graph. Thereafter, the flow reversal ceases, and again becomes positive, and approaches the average flow rate value. This illustration of flow rate pulsations is representative of that produced by a diaphragm fuel pump coupled to a carburetor in an automobile engine fuel supply system when operating at relatively low flow rates. Over a period of time the series of flow rate pulsations pump fluid through a conduit at the average flow rate shown by the dotted line.

Typical turbine flow rate transducers, such as that schematically illustrated in FIG. 1 and described above cannot respond accurately and rapidly to flow rate pulsations that result in flow reversal because the rotational inertia of the rotor 18 will cause the rotor to continue in its forward rotational direction even though the instantaneous flow is in the reverse direction. Under this condition the transducer will continue to provide an output indicative of forward flow through the system, resulting in a cumulative indication that is higher than the actual flow through the system. Even if the rotor could reverse its rotational direction responsive to reverse flow, the digital output of the transducer would continue to provide an indication of forward flow.

When, however, the average flow rate increases so that no reverse flow occurs, as illustrated in FIG. 3, the transducer rotor can respond adequately to provide an indication of the average forward flow through the system.

In accordance with the present invention, a pulsation bypass device 40 is interposed in a parallel fluid connection with the transducer, which device prevents the flow rate pulsations from passing through the transducer while bypassing the pulsations and transmitting them from the upstream side of the tranducer to the downstream side of the transducer. The device of the present invention smooths or averages the flow through the transducer, thus allowing the transducer to experience only the average flow through the conduit 12. The pulsation bypass device 40 comprises a housing 42 the interior of which defines a chamber 44. The housing is constructed so that a diaphragm or flexible fluid impervious membrane 46 can be interposed across the chamber and sealed to the walls of the chamber 44 to divide the chamber 44 into an upstream compartment 44a and a downstream compartment 44b that are separated by the movable, fluid tight barrier. The flexible diaphragm 46 is constructed and interposed in the chamber 44 so that it can flex between at least a first position in the upstream compartment 44a, shown in dotted outline, and a second position, in the downstream compartment 44b. A biasing means, such as a spring 48, is mounted between the central portion of the diaphragm and the downstream wall of the housing 40. The spring 48 biases the diaphragm toward its first position, i.e., when there is no flow in the conduit 12, the spring normally positions the diaphragm in the upstream compartment 44a of the chamber 44. The biasing means is incorporated into the pulsation bypass device to compensate for sudden increases and decreases in flow rate in a manner described below; however, the biasing means is not a necessary component, and in fact can be omitted when the bypass device is being employed to compensate for flow reversal in the line. The upstream compartment 44a of the chamber 44 is fluid coupled via a conduit 50 to the main fluid conduit 12 at a location in the fluid conduit 12 upstream from the inlet 14 to the transducer 10. Likewise, the downstream compartment 44b is fluid coupled via a conduit 52 to the main fluid conduit 12 at a location in the main fluid conduit 12 downstream from the outlet 20 of the transducer 10.

In operation, when a rapidly increasing flow rate pulse occurs in a forward direction, an increased pressure differential across the diaphragm chamber resulting from the increased flow rate will bear on the diaphragm 46 and will tend to flex it against the biasing force of the spring 48 from its first position in the upstream compartment 44a toward its second position in the downstream compartment 44b. As the diaphragm moves toward the second position, the volume of the upstream compartment 44a is increased. At the same time, the volume of the downstream compartment 44b is reduced, causing fluid present in the compartment 44b to flow into the main fluid conduit 12 downstream from the location of the transducer 10. In this manner the rising flow rate pulse is transmitted through the diaphragm chamber from the upstream side of the transducer to the downstream side of the transducer. As the flow rate pulsation decreases and the fluid flow reverses, the diaphragm is forced by the liquid (and in the preferred embodiment by the spring 48) back towards its first position in the upstream compartment 44a of the chamber 44. As a result, fluid flows from the main conduit 12 downstream from the location of the transducer into the downstream compartment 44b. At the same time fluid is exhausted from the upstream compartment 44a into the main conduit 12 upstream of the location of the transducer. In this manner, the negative portion of the flow rate pulsation, i.e., that portion of the pulsation resulting in reverse flow, travels only through the diaphragm chamber and is not experienced by the transducer. Since the transducer is isolated from any reversed flow that may occur in the system, the rotor will respond only to forward flow in the system to provide an accurate indication of the average flow rate from the pump to the carburetor.

In this manner, the pulsation bypass device 40 smoothes the flow rate through the transducer so that the transducer essentially experiences only the average flow rate occurring through the main conduit 12. When the pulsation bypass device is fluid coupled in parallel with the transducer 10, and when flow rate pulsations such as those graphically depicted in FIG. 2 are occurring in the main fluid conduit 12, the transducer will see or experience a flow rate similar to that graphically depicted in FIG. 4. Thus the pulsation bypass device 40 smooths out the positive and negative flow rate pulsations and causes the flow through the inlet conduit 16, transducer 10 and outlet conduit 22 to remain constant and unidirectional from the upstream side of the averaging device 40 to the downstream side of the averaging device 40.

Figures 5, 14, 15:
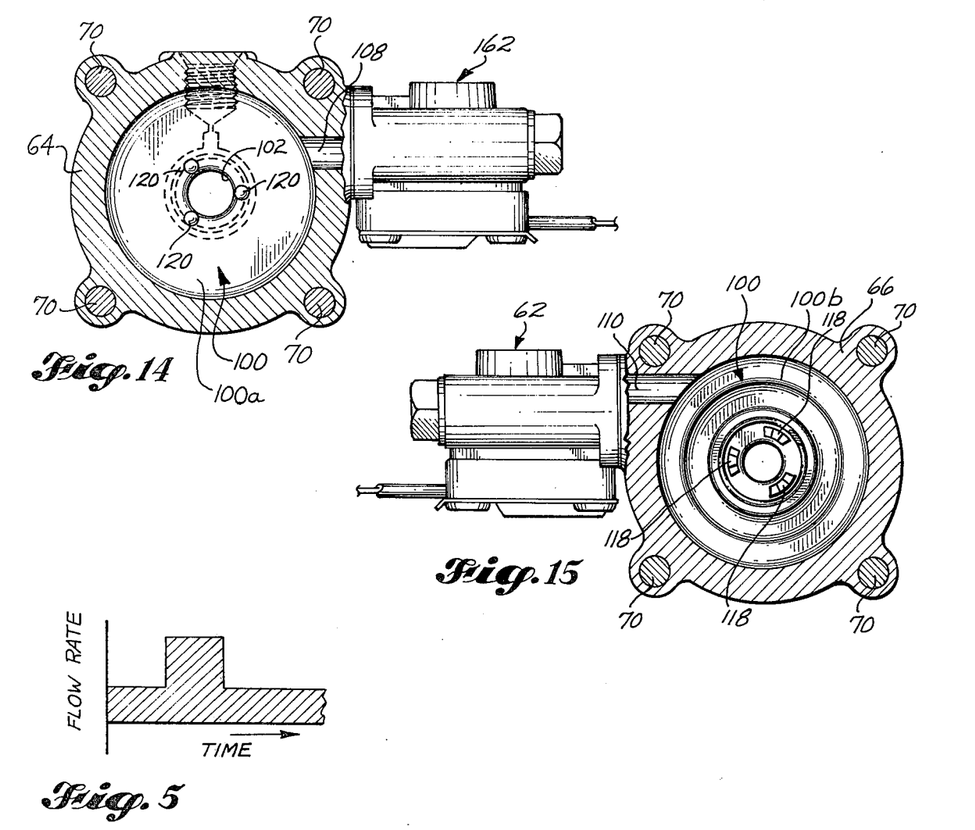
FIG. 5 is a graph of flow rate versus time depicting a step function of flow rate in a fluid conduit representative of a sudden increase of flow rate followed by steady state flow in turn followed by a sudden decrease in flow rate.
FIG. 14 is a cross-sectional view taken along section line 14—14 of FIG. 13.
FIG. 15 is a cross-sectional view taken along section line 15—15 of FIG. 12.
Figure 6:
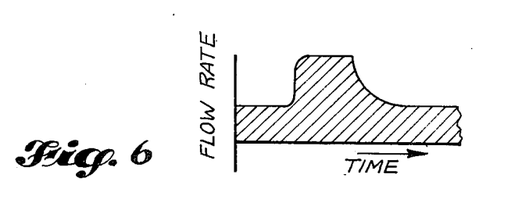
FIG. 6 is a graph of flow rate versus time depicting indicated flow rate of a turbine type transducer when directly subjected to an actual flow rate as depicted in the graph of FIG. 5.

In another aspect of the present invention referring to FIG. 5, the flow rate in the fluid conduit 12 can undergo instantaneous surges, which last for a relatively short time before returning to an original steady state flow rate. A graphical representation of such a surge is depicted in FIG. 5 as a step increase from a steady state rate followed by a step decrease back to the original steady state rate. As the flow rate in the fluid conduit 12 undergoes such a change, a typical turbine type transducer without the pulsation bypass device of the present invention would indicate a flow rate such as graphically depicted in FIG. 6. As the transducer experiences a very sharp rise in flow rate, the transducer rotor will tend to speed up very rapidly and then exponentially approach a speed proportional to the increased flow rate. Thereafter, while the flow rate through the transducer is at a momentary increased constant level, the rotor will maintain a speed proportional to the actual flow rate through the transducer. When, however, the flow rate instantaneously decreases back to its original level, the angular momentum in the rotor will prevent the rotor from slowing down immediately to a speed proportional to the reduced steady state flow rate. Instead, the rotor will coast and gradually slow down to the requisite proportional speed. Thus, during the time when the actual flow rate has decreased back to its original steady level, and when the rotor is coasting, the flow transducer will provide a flow rate indication higher than the actual true flow rate. Moreover, if the indicated flow rate signal from the transducer is used as an input signal to provide a total volumetric flow indication, the total flow indicated will be a higher value than the actual cumulative volume flowing through the transducer.

Figure 7:
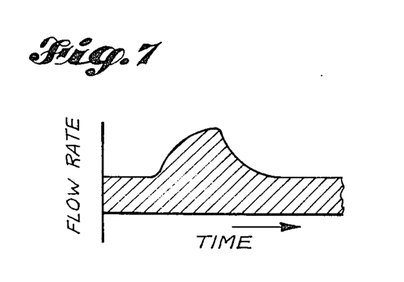
FIG. 7 is a graph of the indicated flow rate versus time of fluid flowing through a turbine type transducer when the pulsation bypass device of the present invention is used and when subjected to an actual flow rate as depicted in FIG. 5.
Figure 8:
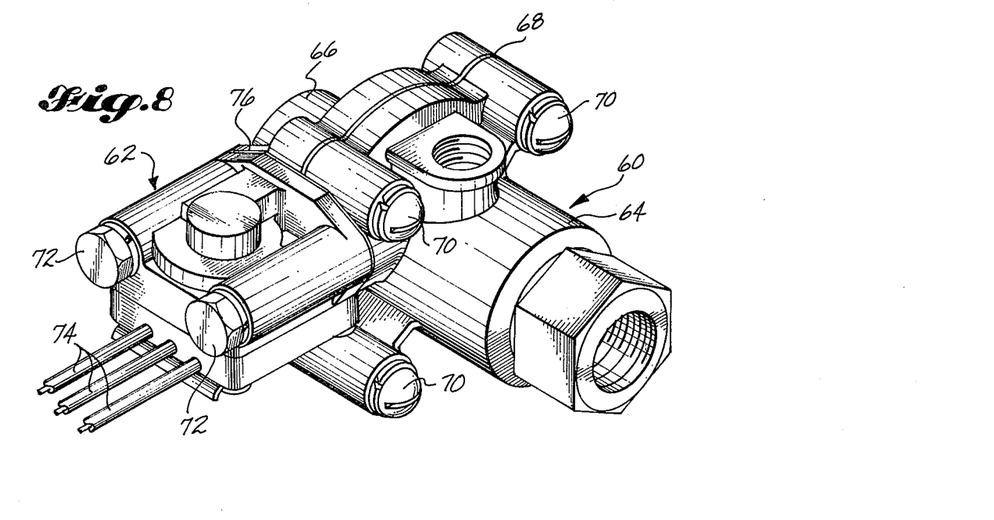
FIG. 8 is an isometric view of a preferred embodiment of the pulsation bypass device of the present invention coupled to a flow rate transducer.

By using the pulsation bypass device 40 of the present invention, schematically depicted in the FIG. 1, the flow through the transducer can be modified to eliminate instantaneous flow rate surges and thereby provide adequate time for the rotor to speed up and slow down gradually so that its output signal is proportional to the actual flow rate through the transducer. FIG. 7 is a graphical representation of the actual flow rate through the transducer when coupled to the pulsation bypass service 40 of the present invention when subjected to an instantaneous flow rate increase and decrease of the type graphically depicted in FIG. 5. The pulsation bypass device of the present invention modifies the actual flow rate so that the flow rate through the transducer gradually increases and decreases with time. When subjected to gradual increases and decreases in flow rate, the transducer rotor can respond quickly enough in both speeding up and slowing down to provide a signal proportional to the actual flow rate during the surge. Since the transducer can provide an accurate signal proportional to the gradual changes in flow through the transducer, so that when output signal from the transducer is integrated, an accurate indication of total flow through the main fluid conduit 12 during the momentary flow rate surge can be obtained.

The pulsation bypass device 40 of the present invention modifies the flow rate through the transducer by allowing the diaphragm 46 to flex toward the downstream compartment 44b of the chamber 44 when the flow rate instantaneously increases. As the diaphragm flexes, the volume of the upstream compartment increases and receives a portion of the increased flow, reducing the surge through the transducer. When the flow rate increases, the pressure drop across the transducer increases, also increasing the pressure differential across the diaphragm chamber. When the flow rate stabilizes at its higher level, the spring 48 will prevent the diaphragm from flexing further toward the downstream compartment 44b. the increased pressure drop will hold the diaphragm at this intermediate position between its extreme first and second positions in the upstream and downstream compartments 44a and 44b, respectively, against the biasing force of the spring. When the momentarily increased flow rate returns to a lower steady state level, the biasing force of the spring will flex the diaphragm toward its first position in the upstream compartment 44a of the chamber 44. As the actual flow rate in the fluid conduit 12 drops instantaneously and the diaphragm flexes toward its first position, an additional fluid is caused to flow out of the upstream compartment 44a through the transducer inlet conduit 16 and through the transducer 10. In this manner, the additional fluid flowing through the transducer 10 will cause a gradual decrease in flow rate, providing the transducer rotor 18 adequate time to reduce its angular velocity at a rate proportional to the decrease in fluid flow rate through the transducer 10.

Thus, by providing a relatively simple mechanical device employing a flexible diaphragm that can move between at least two positions and that is biased toward one of those positions by means such as a spring, several problems inherent in volumetric flow rate measurement in fluid systems that experience flow reversal and rapid changes in flow rate are overcome. It is to be understood that any of a variety of movable members corresponding to the diaphragm 46 and biasing means corresponding to the spring 48 can be employed. For example, a piston can be mounted in a cylinder and centered by one or more springs within the cylinder. The ends of the cylinder should then be coupled to the upstream and downstream inlets to the transducer. Moreover, a self-centering, resilient, flexible diaphragm can be substituted for the flexible diaphragm and spring of the embodiment described above.

Turning now to FIGS. 8 through 15, a preferred embodiment of the pulsation bypass device of the present invention is illustrated in conjunction with a flow rate transducer. Referring first to FIGS. 8 through 11, the apparatus includes a housing 60 for the pulsation bypass device and a housing 62 for the flow rate transducer itself. The housing 60 for the bypass device comprises an inlet section 64 and an outlet section 66 secured to each other along mutually abutting faces with the peripheral portion of the diaphragm 68 interposed there between. The inlet and outlet sections 64 and 66 of the housing are affixed to each other by suitable fastening devices such as bolts 70 threaded through suitable aligned bores in the inlet and outlet sections 64 and 66. Likewise, the transducer housing 62 is secured along mutually abutting faces to the inlet and outlet sections 64 and 66 of the flow rate averaging device housing. A suitable seal 76 is interposed between the abutting faces of the transducer housing 62 and the housing 60 for the bypass device. The flow rate transducer housing 62 is fixed to the housing of the bypass device via fasteners such as bolts 72 threaded through aligned bores in both the two housings. Suitable leads 74 are mounted in the transducer housing 62 to transmit the signals from an optical detection means mounted within the housing to detect the angular rotational frequency of the rotor (shown in dotted outline in FIGS. 9 through 11) mounted within the transducer housing 62.

Figures 9, 10, 11, 12, 13:
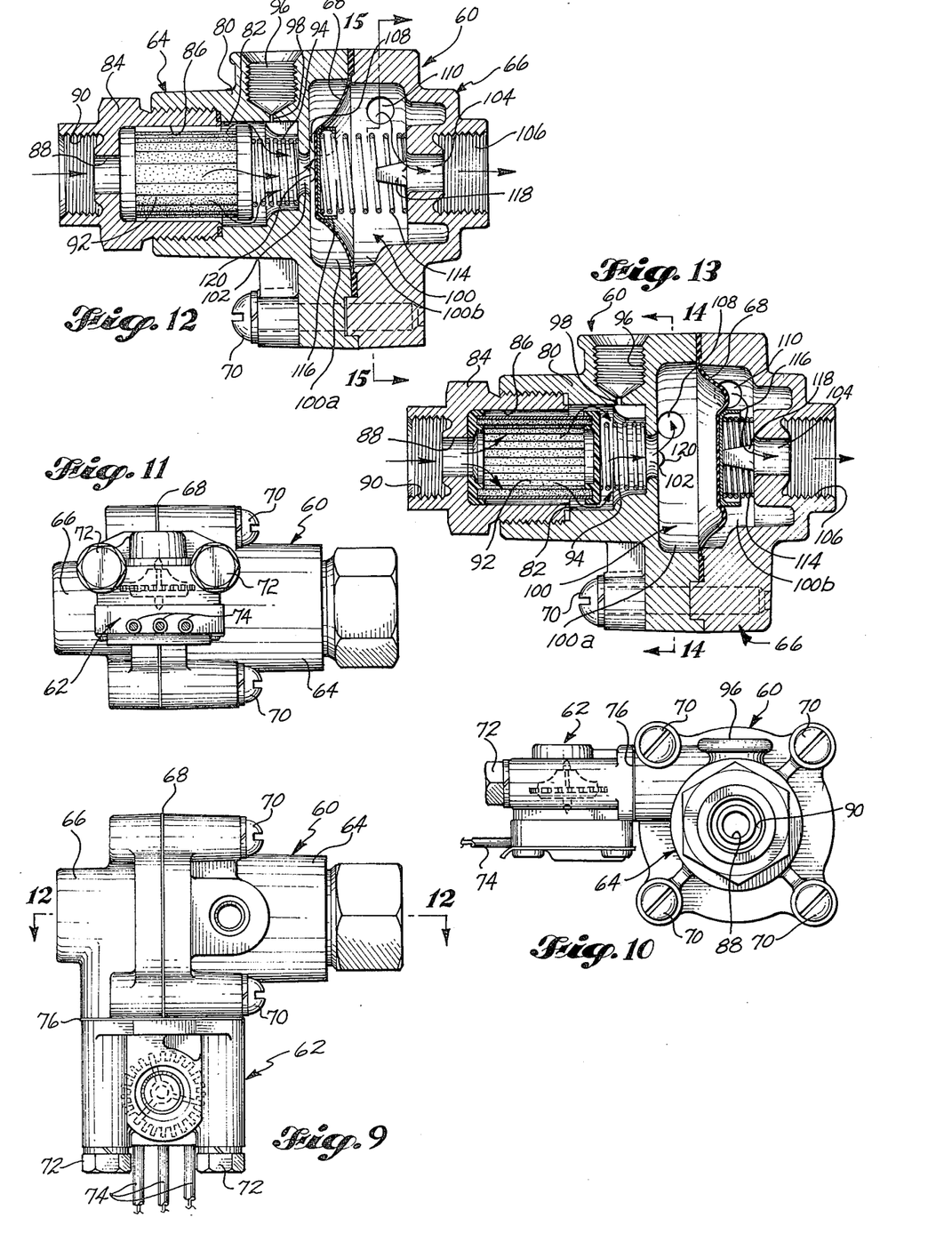
FIGS. 9, 10 and 11 are respectively a plan view of, an elevation view showing the inlet side of, and a side view of the flow rate transducer and pulsation bypass device of the present invention.
FIG. 12 is a partial longitudinal sectional view across the direction of flow through the pulsation bypass device illustrated in FIG. 9 and taken along section line 12—12, showing the diaphragm in a first position before being subjected to an increasing flow rate pulse.
FIG. 13 is a partial longitudinal sectional view similar to that illustrated in FIG. 12 showing the diaphragm in a second position after being subjected to an abruptly increasing flow rate.

Referring now to the longitudinal sectional views of FIGS. 12 and 13, the inlet section 64 of the housing 60 for the bypass device includes a main body 80 and an end plug and coupling 84. The main body 80 contains a longitudinally extending, cylindrically shaped cavity 82. A longitudinal bore or recess in the coupling 84 defines an extension cavity 86 of the cavity 82 in the main body 80 of the inlet section of the housing 60. The coupling 84 contains a second smaller bore 88 that extends axially outwardly from the extension cavity 86, communicating with a larger, threaded female coupling bore 90. The bore 88 forms the inlet channel to the cavity 82 and 86. A suitable male coupling is used to connect the coupling bore 90 to a fluid conduit. The coupling 84 has on its downstream end external threads which engage internal threads on the main body 80 to secure the coupling 84 within the main body 80 and to form the longitudinally extending cylindrically shaped cavity 82 and 86. A fluid filter element 92 is positioned in the cavity 82 and 86 and is biased toward the coupling 84 by a spring 94 interposed between the downstream, closed end of the filter 92 and the downstream transverse wall of the cavity 82 in the main body 80. The filter is of conventional design having an open upstream end, an annulus of filter material, and a closed downstream end. Fluid flowing into the cavity 82 and 86 from the inlet channel enters the upstream end through the bore 88 in the coupling 84, flows through the annular filter element, oriented longitudinally in the cavity 82 and 86 and flows radially outwardly through the filter material into the annular cavity formed between the outer wall of cavity 86 and 82 and the outer cylindrical surface of the filter element 92.

The upper portion of the main body 80 contains a well 96 communicating with the exterior of the upper portion of the main body 80. The well 96 is internally threaded and serves as a coupling location to a conduit or hose in a vapor return system present in modern automobile fuel systems. The vapor return system returns fuel vapors from the automobile fuel supply system to the automobile fuel storage tank. A small orifice 98 couples the well 96 with the cavity 82 formed in the main body 80. The orifice is sized so as to readily pass fuel vapor but to substantially restrict liquid fuel flow. For example, the cavity can be designed to pass a substantial quantity of fuel vapor but no more than on the order of 1 to 2 gallons per hour of liquid fuel.

The downstream or outlet section 66 of the housing is positioned longitudinally in a downstream direction from the upstream section 64 of the housing and lies along the axial or longitudinal dimension of the filter cavity 82 and 86. A cylindrically shaped cavity 100, having its axial dimension extending in the longitudinal direction of the housing 60, is formed in the main body 80 and extends into both the downstream section 66 and the upstream section 64 of the housing 60. A flexible diaphragm 68 is positioned transversely across the cavity 100 so as to divide the cavity into an upstream compartment 100a formed in the main body 80 of the upstream section of the housing and a downstream compartment 100b formed in the downstream section 66 of the housing 60. The flexible diaphragm 68 extends across and beyond the walls of the cavity 100. The peripheral portion of the diaphragm is secured between mutually opposing, annular, sealing faces on the downstream section 66 of the housing and the upstream section 64 of the housing 60. The bolts 70 (best seen in FIGS. 8 through 11) secure the two housing sections 64 and 66 together. The diaphragm thus divides the chamber 100 into its upstream and downstream compartments 100a and 100b and forms a flexible, fluid seal between the two compartments 100a and 100b. The diaphragm 68 can be manufactured from any suitable material, for example a resilient synthetic elastomer, a natural rubber composition, or preferably a synthetic cloth impregnated with rubber or a synthetic elastomer.

The upstream compartment 100a of the chamber formed within the housing 60 is placed in fluid communication with the filter cavity 82 and 86 in the main body 80 of the upstream section 64 of the housing 60 through longitudinal bore 102. The bore 102 is located along the axial dimension of the diaphragm chamber 100 so that fluid entering the chamber will impinge upon the central portion of the diaphragm. In use the fluid jet from the bore 102 tends to overcome the inertia of the diaphragm and its related biasing spring when at rest. The downstream compartment 100b of the diaphragm chamber 100 communicates via a longitudinal bore 104 with a threaded female connector socket 106 formed in the downstream end of the downstream portion 66 of the housing 60. A suitable coupling (not shown) is employed to connect the socket 106 to a fluid conduit. The upstream compartment 100a of the chamber 100 is placed in fluid communication with the inlet to the transducer housing 62 via a bore 108 extending outwardly through the main body 80 of the upstream section 64 of the housing 60. In a similar manner, the downstream compartment 100b of the diaphragm chamber is placed in fluid communication with the outlet from the transducer housing 62 via a longitudinal bore 110 extending from the downstream compartment 100b to the exterior of the downstream portion 66 of the housing 60.

In the preferred embodiment, the diaphragm biasing means comprises a spring 114 interposed between the downstream side of the diaphragm 68 and the downstream, transverse wall of compartment 100b of the chamber 100. A retainer cap 116 covers the upstream end of the spring 114 and serves the dual function of radially centering the spring on the diaphragm 68 and providing a wear surface to protect the normally fragile nature of the material from which the diaphragm is made.

As best seen in FIGS. 12 and 15, a plurality of projections 118 extend in an upstream direction inwardly into the cavity 100 from the downstream wall of the compartment 100b. The three projections 118 are positioned inside the coil spring 114 and serve a dual function of radially centering the spring 114 so that it circumscribes the axial outlet bore 104 in the downstream compartment 100b and serves as a stop for the diaphragm movement into the downstream compartment 100b (as illustrated in FIG. 13). Thus, the inward end of the projections 118 abut against the retainer cap 116 thereby limiting the movement of the diaphragm 68. As best seen in FIGS. 12 and 14, three small nodes 120 are positioned about the bore 102 between the filter cavity 82 and 86 and the upstream compartment 100a of the diaphragm chamber 100. These nodes serve to limit the movement of the diaphragm in an upstream direction so that the diaphragm when at the limit of its upstream flex does not block the diaphragm chamber inlet bore 102 or the transducer inlet bore 108.

The operation of the preferred embodiment and the function of the diaphragm in relation to bypassing flow rate pulsations past the transducer 62 is identical to the operation described above in conjunction with the schematic drawing of FIG. 1. As shown in FIG. 12, the diaphragm 68 is illustrated in its extreme upstream position located in the upstream compartment 100a of the diaphragm chamber 100. This is the position to which it is normally biased by the spring 114 when there is no flow through the device. As shown in FIG. 13, the diaphragm is illustrated in its extreme downstream flex position located in the downstream compartment 100b of the diaphragm chamber 100. This is the position to which it flexes when a large pressure drop occurs across the diaphragm chamber, fully compressing the spring 114.

In operation the preferred embodiment of the pulsation bypass device fulfills all of the objects of the present invention. In addition placement of the bypass device in fluid communication with the vapor return system of an automobile fuel supply system immediatly upstream of the upstream compartment 100a of the diaphragm chamber 100 serves a dual function. First, the vapor present in the fuel as it enters the filter chamber is removed before the fuel enters the diaphragm chamber. By so doing, the possibility of the vapor bubbles interfering with the optical detector in the transducer is eliminated. Moreover, the vapor present in the portion of the fluid conduit upstream of the transducer is substantially reduced or eliminated, thus reducing or eliminating some of the reason for flow rate surges in a fuel supply system. Secondly, and unexpectedly, it has been found that by providing a relatively high vapor and liquid flow rate through the orifice 98 into the vapor return system, the expanding fuel into the vapor return system will absorb heat from the fuel present in the housing and the housing itself, thus reducing the temperature of the housing and most importantly of the fuel. By reducing the temperature of the fuel, the tendency for the liquid fuel to create vapor is reduced. For example, flow rates on the order of 15 gallons per hour through the orifice 98 into the vapor return system will virtually eliminate vapor formation upstream from the transducer.

The present invention has been described in relation to a broad conceptual aspect of the invention and with respect to a presently preferred embodiment. After reading the foregoing specification, one of ordinary skill in the fuel measurement art will be able to make various changes, substitutions of equivalents, and other alterations without departing from the overall inventive concept disclosed herein. It is therefore intended that the protection afforded by patent be limited only by the definition contained in the appended claims.

What is claimed is:

1. A device for use with a flow rate transducer means, said transducer means for measuring flow rate through a conduit, said flow rate transducer means having a fluid inlet and a fluid outlet and being capable of providing a signal indicative of flow rate therethrough, said device for bypassing flow rate pulsations occurring in said conduit around said transducer at low flow rates, said device comprising:

a housing defining a fluid chamber, said chamber having a wall and an axis, a flexible diaphragm means mounted in said chamber and being oriented transversely to said axis, said diaphragm having a central portion intersected by said axis, said diaphragm means having a periphery affixed to said housing in fluid sealing relationship so as to divide said chamber into a first compartment and a second compartment, said diaphragm means being movable between at least a first position and a second position, said diaphragm means being biased toward said first position and away from said second position, first means associated with said housing for placing said first compartment in fluid communication with the inlet to said fluid transducer, said first means including an inlet conduit means in said housing defining a fluid inlet to the first compartment of said chamber, the central portion of said diaphragm means in said first position lying adjacent said fluid inlet, said fluid inlet lying on said axis and being positioned in said housing so as to inject a fluid jet into said chamber substantially along said axis and to direct said fluid jet to impinge upon the central portion of said diaphragm means, said diaphragm means in said second position being flexed away from said first position toward said second compartment of said chamber responsive to fluid flow into said first compartment, and second means associated with said housing for placing said second compartment in fluid communication with the outlet from said transducer.

2. The device of claim 1 wherein said chamber is substantially cylindrically shaped and wherein said second means defines a fluid outlet in said chamber positioned in said housing axially of said chamber so as said diaphragm flexes to said second position said diaphragm will force fluid axially out of said chamber.

3. The device of claim 1 wherein said housing includes at least one projection positioned adjacent said fluid inlet, said projection extending into said chamber in a direction substantially parallel to the axis of said chamber, said projection serving to limit movement of said diaphragm toward said inlet and to space the central portion of said diaphragm from said inlet when said diaphragm is in said first position.

4. The device of claim 1 further comprising means separate from said diaphragm means for biasing said diaphragm means towards said first position, said means for biasing being located in said second compartment of said chamber.

5. The device of claim 4 wherein said biasing means comprises a spring abutting a wall of said chamber, said spring being expandable to position said diaphragm means in said first position, said spring being compressed when said diaphragm means is in said second position.

6. The device of claim 4 wherein said means for biasing said diaphragm means comprises a spring located in the second compartment of said chamber, said device further comprising a spring retainer means affixed to the central portion of said diaphragm means, said spring retainer means being substantially rigid and restraining movement of said spring in a direction transverse to the axis of said chamber.

7. A device for bypassing fluid flow pulsations past a flow rate transducer capable of providing a signal indicative of the flow rate therethrough, said transducer having an inlet and an outlet, said device comprising:

first means defining a chamber, said chamber having a wall, a first end, and a second end, second means mounted in said chamber for movement between a first position located toward the first end of said chamber and a second position spaced from said first position and located toward the second end of said chamber, third means for forming a fluid seal between said second means and the wall of said chamber, said second and third means thereby forming a movable fluid barrier between the first end and the second end of said chamber, fourth means associated with said first means and defining a fluid channel for placing the first end of said chamber in fluid communication with the inlet to said transducer, said fluid channel terminating in said first end of said chamber in an inlet means, said inlet means being so associated with said chamber to direct a fluid jet emanating from said inlet means toward said second means upon occurrence of a fluid flow pulsation in said fluid channel so as to cause said fluid jet to impinge upon said second means, fifth means associated with said first means and defining a fluid channel for placing said second end of said chamber in fluid communication with the outlet from said transducer, and sixth means coacting with said first and second means for biasing said second means toward said first position, said second means in said first position being located adjacent said inlet means.

8. The device of claim 7 wherein said second means is a flexible, fluid impervious membrane.

9. The device of claim 8 wherein said third means comprises an integral peripheral portion of said membrane.

10. In combination with a flow transducer for measuring fluid flow through a conduit, said flow transducer including a transducer housing defining a fluid flow chamber, a rotor mounted in said transducer housing for rotation within said chamber, a fluid inlet to the chamber in said transducer housing, a fluid outlet from the chamber in said transducer housing, and means associated with said transducer housing for providing a signal indicative of the rotational speed of said rotor, said rotational speed being substantially proportional to the flow of fluid through said chamber, an improvement for bypassing flow rate pulsations occurring in said conduit past said transducer comprising:

a second housing operatively associated with said transducer housing, said second housing having a second chamber therein, said second chamber having a wall, a movable member mounted for reciprocating movement in said second chamber, said member dividing said second chamber into first and second compartments, and means associated with said member and said housing for providing a fluid seal between said member and the wall of said second chamber, thereby providing a movable fluid barrier between the first and second compartments in said second chamber, first conduit means coupled between said first compartment of said second chamber and the inlet to said transducer for placing said first compartment in fluid communication with the inlet to said transducer, second conduit means coupled between said second compartment of said second chamber and the outlet from said transducer for placing said second compartment in fluid communication with the outlet from said transducer, inlet means in said second housing defining a fluid inlet to said first compartment for coupling said first compartment to a conduit through which flow is to be measured, said fluid inlet being oriented relative to said movable member so as to create a fluid jet in said chamber upon occurrence of a flow rate pulsation and to cause said fluid jet to impinge upon said movable member to overcome the inertia of said movable member when it is at rest, biasing means for biasing the movement of said movable member in said chamber toward said first compartment and positioning said movable member adjacent said fluid inlet, and outlet means in said second housing for defining a fluid outlet from said second compartment for coupling said second compartment to a conduit through which flow is to be measured.

11. The device of claim 10 further comprising:

vent means associated with said second housing and said first compartment, said vent means being in fluid communication with said first compartment for venting vapor from a fluid flowing therethrough, said vent means capable of restricting the flow of fluid therethrough while readily venting vapor.

12. The device of claim 10 wherein said second chamber is substantially cylindrically shaped and has an axis, and wherein said movable member comprises a flexible membrane having a central portion, said membrane being oriented transversely to said axis so that the central portion thereof is intersected by said axis, said inlet means being so oriented and constructed about said axis as to direct fluid entering said first compartment of said second chamber along said axis, thereby causing said fluid to impinge upon the central portion of said membrane.

13. The device of claim 12 wherein said outlet means is oriented and constructed about said axis so that, as said membrane moves to said second position, said membrane will force fluid from said chamber along said axis.

14. A method for bypassing flow rate pulsations occurring in a fluid conduit past a flow rate transducer interposed in said conduit, said transducer having an upstream side and a downstream side, said method comprising the steps of:

coupling a fluid chamber in parallel with said transducer so that one end of said chamber is in fluid communication with the upstream side of said transducer and so that the other end of said chamber is in fluid communication with the downstream side of said transducer, interposing a flexible membrane in said chamber to form a movable, fluid impervious seal between the one end and the other end of said chamber, biasing the movement of said membrane toward the one end of said chamber with a force less than the maximum pressure drop across said transducer, and injecting fluid into one side of said chamber so as to form a fuild jet adjacent said membrane, said fluid jet impinging upon said membrane to move said membrane from the one end of said chamber to the other end of said chamber upon occurrence of a flow rate pulsation in said conduit.

15. The device of claim 1 wherein said transducer is a turbine type transducer.

16. The device of claim 7 wherein said transducer is a turbine type transducer.

17. The method of claim 14 wherein said transducer is a turbine type transducer.

18. In combination with a flow transducer for measuring fluid flow through a conduit, said flow transducer including a transducer housing defining a fluid flow chamber, a rotor mounted in said transducer housing for rotation within said chamber, a fluid inlet to the chamber in said transducer housing, a fluid outlet from the chamber in said transducer housing, and means associated with said transducer housing for providing a signal indicative of the rotational speed of said rotor, said rotational speed being substantially proportional to the flow of fluid through said chamber, an improvement for bypassing flow rate pulsations occurring in said conduit past said transducer comprising:

a second housing coupled to said transducer housing, said second housing having a second chamber therein, said second chamber having a wall, a flexible fluid impervious membrane mounted for reciprocating movement in said chamber, said membrane dividing said second chamber into first and second compartments, and means associated with said membrane and said housing for providing a fluid seal between said membrane and the wall of said second chamber, thereby providing a movable fluid barrier between the first and second compartments in said second chamber, first conduit means coupled between said first compartment of said second chamber and the inlet to said transducer for placing said first compartment in fluid communication with the inlet to said transducer, second conduit means coupled between said second compartment of said second chamber and the outlet from said transducer for placing said second compartment in fluid communication with the outlet from said transducer, biasing means for biasing the movement of said membrane toward said first compartment, inlet means in said second housing defining a fluid inlet to said first compartment for coupling said first compartment to a conduit through which flow is to be measured, outlet means in said second housing for defining a fluid outlet from said second compartment for coupling said second compartment to a conduit through which flow is to be measured, and vent means associated with said second housing and said first compartment, said vent means being in fluid communication with said first compartment for venting vapor from a fluid flowing therethrough, said vent means capable of restricting the flow of fluid therethrough while readily venting vapor.

* * * * *